(12) United States Patent
May et al.

(10) Patent No.: US 6,917,122 B2
(45) Date of Patent: Jul. 12, 2005

(54) DEVICE FOR CONNECTING COMMUNICATIONS NETWORKS IN A MOTOR VEHICLE

(75) Inventors: Thomas May, Wolfenbuettel (DE); Hartwig Koch, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 10/102,225

(22) Filed: Mar. 20, 2002

(65) Prior Publication Data

US 2002/0156554 A1 Oct. 24, 2002

(30) Foreign Application Priority Data

Mar. 20, 2001 (DE) .......................................... 101 13 321

(51) Int. Cl.⁷ ................................................. B60L 1/00
(52) U.S. Cl. ...................... 307/9.1; 307/10.1
(58) Field of Search ................. 307/9.1, 10.1

(56) References Cited

U.S. PATENT DOCUMENTS

| | | | |
|---|---|---|---|
| 5,732,074 A | | 3/1998 | Spaur et al. |
| 6,145,082 A | * | 11/2000 | Gannon et al. ............ 713/201 |
| 6,163,536 A | * | 12/2000 | Dunn et al. ................. 370/352 |
| 6,326,704 B1 | * | 12/2001 | Breed et al. ................. 307/9.1 |

FOREIGN PATENT DOCUMENTS

| | | |
|---|---|---|
| DE | 41 103 72 | 10/1991 |
| DE | 196 40 148 | 4/1998 |
| DE | 197 55 686 | 6/1999 |
| DE | 197 57 335 | 7/1999 |
| DE | 198 05 464 | 8/1999 |
| DE | 198 37 242 | 3/2000 |
| DE | 195 15 194 | 10/2000 |
| DE | 199 25 570 | 12/2000 |
| EP | 0 71331 | 2/1983 |

OTHER PUBLICATIONS

Dedelmahr et al, "The C167CR Adds Gateway Functions to the Automotive Computer", Components, Siemens AG, vol. 32, No. 6, 1997.

Andreas Schmeiser, Konzeption und Imlementierung eines dezenralen datenbankgestutzen Fahrzeugdiagnose–und Fernwartungssystem mit integrieter Gatewayfunktionalitat Diplomarbeit Universitat Ulm, Sep. 14, 1999, S 79–99. English abstract.

* cited by examiner

Primary Examiner—Robert L. Deberadinis
(74) Attorney, Agent, or Firm—Kenyon & Kenyon

(57) ABSTRACT

A device for connecting communications networks has a safety switch with which two communications networks present in the motor vehicle may be connected by a user. In this connection, in particular, a multimedia network having an air interface, preferably implemented by a mobile phone, is connected to a safety network to which vehicle components are connected that are critical to safety. This connection becomes necessary when a remote diagnosis of the vehicle components or a software update is to be undertaken.

12 Claims, 3 Drawing Sheets

DEVICE FOR CONNECTING COMMUNICATIONS NETWORKS IN A MOTOR VEHICLE

BACKGROUND INFORMATION

Communications networks are installed in motor vehicles for data communication between the individual components. For this purpose, the Controller Area Network (CAN) bus and the Media Oriented Systems Transport (MOST) bus are provided, for instance.

SUMMARY OF THE INVENTION

The device according to the present invention for connecting communications networks in a motor vehicle has the advantage that a safety switch is present by which the communications networks present in a motor vehicle may be connected in certain situations. An electrical isolation is established by the safety switch according to the present invention, so that a first communications network cannot influence a second communications network, and thus particularly cannot interfere with it. Thereby, from an objective point of view, the safety of the system is increased. A motor vehicle's buyer's or user's reservations as to the safety of such communications networks are thereby strongly allayed, since access to an element critical to safety, such as an ABS system, is secured with a great degree of protection. In addition, only the user himself can actively close the switch. Thus, it is completely in the hands of the user to make possible access to a communications network that is critical to safety.

It is of special advantage that a permanent one-way communication exists between the two communications networks, namely from the communications network that is critical to safety to, for example, a multimedia network that is not critical to safety. In this connection, system data can be transmitted to the multimedia network via the one-way communication, such as the state of the individual components, so that these system data are, for example, repeated by an indicator, in order, possibly, to signal a malfunction or the falling of a component parameter into a danger zone.

Then by closing the safety switch, in an advantageous way, a duplex communication between the two communications networks is made possible, so that data from the data network critical to safety may also be extracted. In particular, a software update of components connected to the data network critical to safety is also possible. That means, that data from outside can be imported into the communications network that is critical to safety. Alternatively, it is possible that communication between the communications networks is made possible by the safety switch. This increases the safety of the system.

It is also of advantage that the first communications network, here a multimedia network, has an air interface which can be activated by closing the safety switch. This makes it possible that, when the user closes the safety switch, a predetermined connection is established via the air interface, for example, to make possible a remote diagnosis or a software update of components in the communications network that is critical to safety. In this connection, it is particularly provided that such data may be received only when the safety switch is closed, by an external server via the air interface. Thereby a high degree of safety and data integrity are achieved.

In addition, it is of advantage that, when the safety switch is closed, the air interface of the first communications network automatically contacts an opposite station, the opposite station taking up contact with the second communications network that is critical to safety, via the first communications network. That is, when the switch is closed, only then is it possible for an opposite station to take up contact with the communications network that is critical to safety. This too increases the safety of the device according to the present invention. For this purpose, the opposite station may be preprogrammed with a fixed read only program.

DETAILED DESCRIPTION

Because of the increasing cross-linkage of components in motor vehicles, on the one hand in the area of engine management, and, on the other hand, in the area of the multimedia components, it becomes necessary to link the two areas in order, for example, to conduct a remote diagnosis of the engine or to load new software for an ABS system. In this connection, it is advantageous if the multimedia components have an air interface, which is designed especially as a mobile phone. Now, according to the present invention, a safety switch is provided between a communications network that is critical to safety and the multimedia communications network, which can only be closed by a user. Thus, access to the communications network that is critical to safety can occur only with the agreement of the user.

Figure 1:
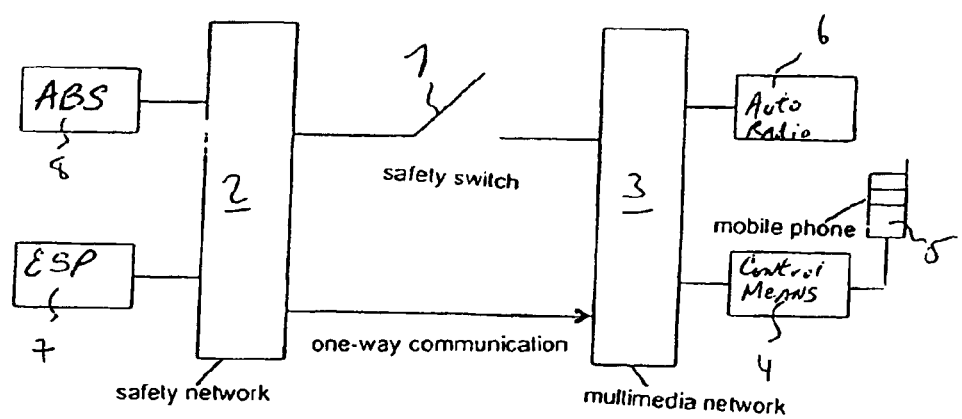
FIG. 1 shows a block diagram of the device according to the present invention.

FIG. 1 shows the device according to the present invention as a block diagram. A safety switch 1 is connected on one side to a safety network 2, and on the other side to a multimedia network 3. Opening safety switch 1 leads to electrical isolation of safety network 2 and multimedia network 3. However, here it is provided that an optional permanent connection between the safety network and the multimedia network exists, which, however, makes possible only a one-way communication from safety network 2 to multimedia network 3. That is, only system data from safety network 2 are transmitted for representation in multimedia network 3. This avoids access to the components of the safety network, brake or engine control. An auto radio 6 and a control means for the mobile phone 4 are connected here to multimedia network 3 via data inputs/outputs. Control means 4 is further connected to a mobile phone 5 via a data input/output. It is possible for further components to be connectible to multimedia network 3, such as a navigational device or an auto PC. This multimedia network 3 is implemented as a MOST bus, but it is also possible to use a so-called firewire bus or any other bus desired (ethernet, VSB).

An ABS (anti-blocking system) 8 is connected to safety network 2, and so is an ESP (electronic stability program) 7. Safety network 2 is here implemented as a CAN bus. It is possible to connect further components to the CAN bus, such as an engine control.

The user of the motor vehicle will close safety switch 1, for instance, by operating a switch or a key or by a voice command, when he wishes to conduct a diagnosis of components 7 and 8 connected to safety network 2. In this connection, a software update of these individual components 7 and 8 is also possible. For this purpose, a connection is established via mobile phone 5 to a server of a firm that performs teleservice.

Figure 2:
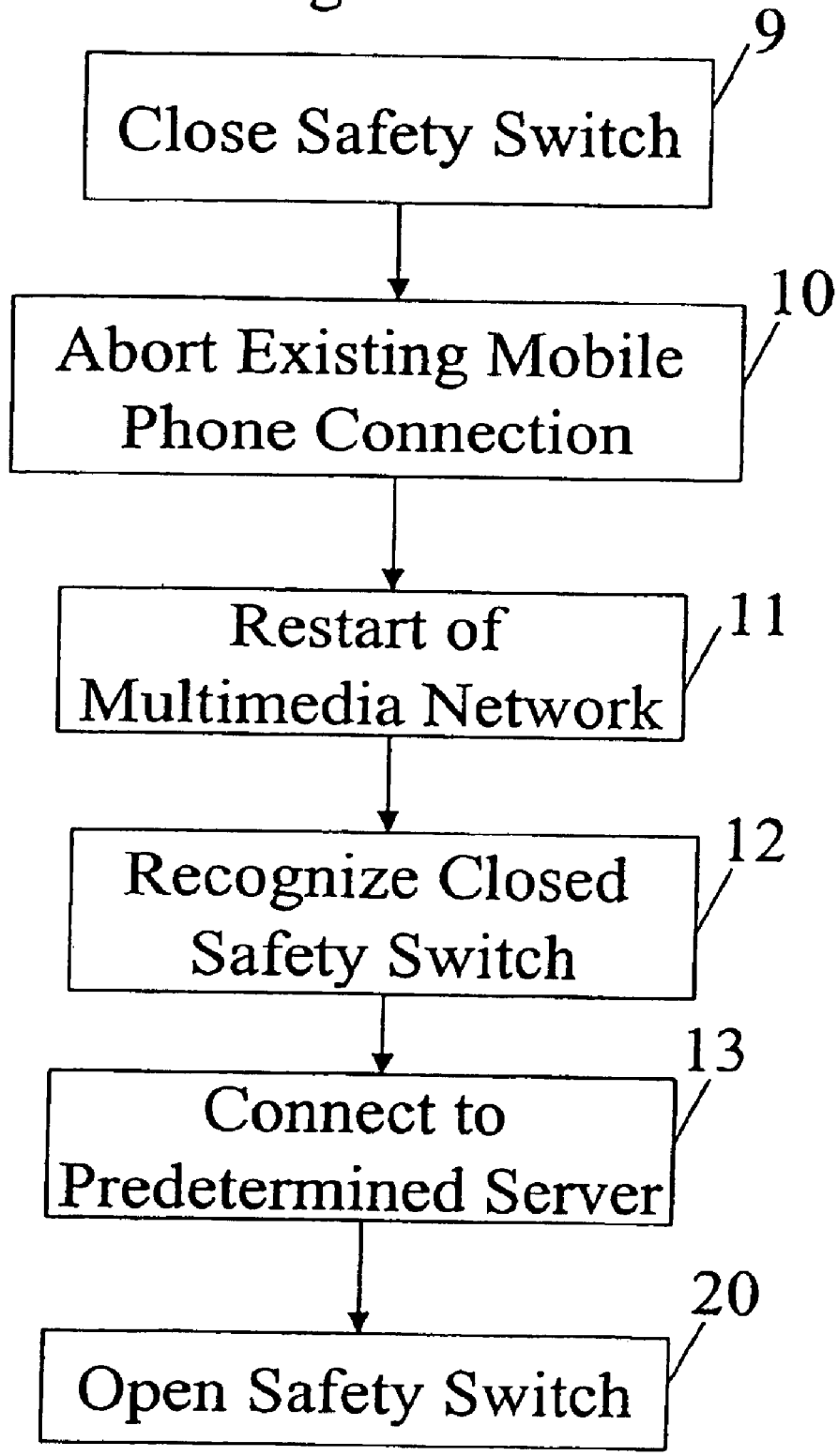
FIG. 2 shows a first flow chart according to the present invention.

FIG. 2 shows a method according to the present invention as a first flow chart. In method step 9, a user closes safety switch 1. In method step 10 mobile phone connections still existing via mobile phone 5 are then disconnected. In method step 11, multimedia network 3 is started afresh, and in method step 12 it recognizes that safety switch 1 has been closed. Since this is the case, a connection is established by control means 4 via mobile phone 5 to a server stored hard-coded in control means 4. Then a teleservice on devices 7 and 8 connected to the safety network can be conducted from the server, and possibly a software download can be performed. Safety switch 1 can be automatically opened after the diagnosis and the software download are completed. Alternatively, this can be done by hand. This is mentioned in method step 20. Thereafter, any desired communications connection starting from multimedia network 3 can again be established using mobile phone 5.

Figure 3:
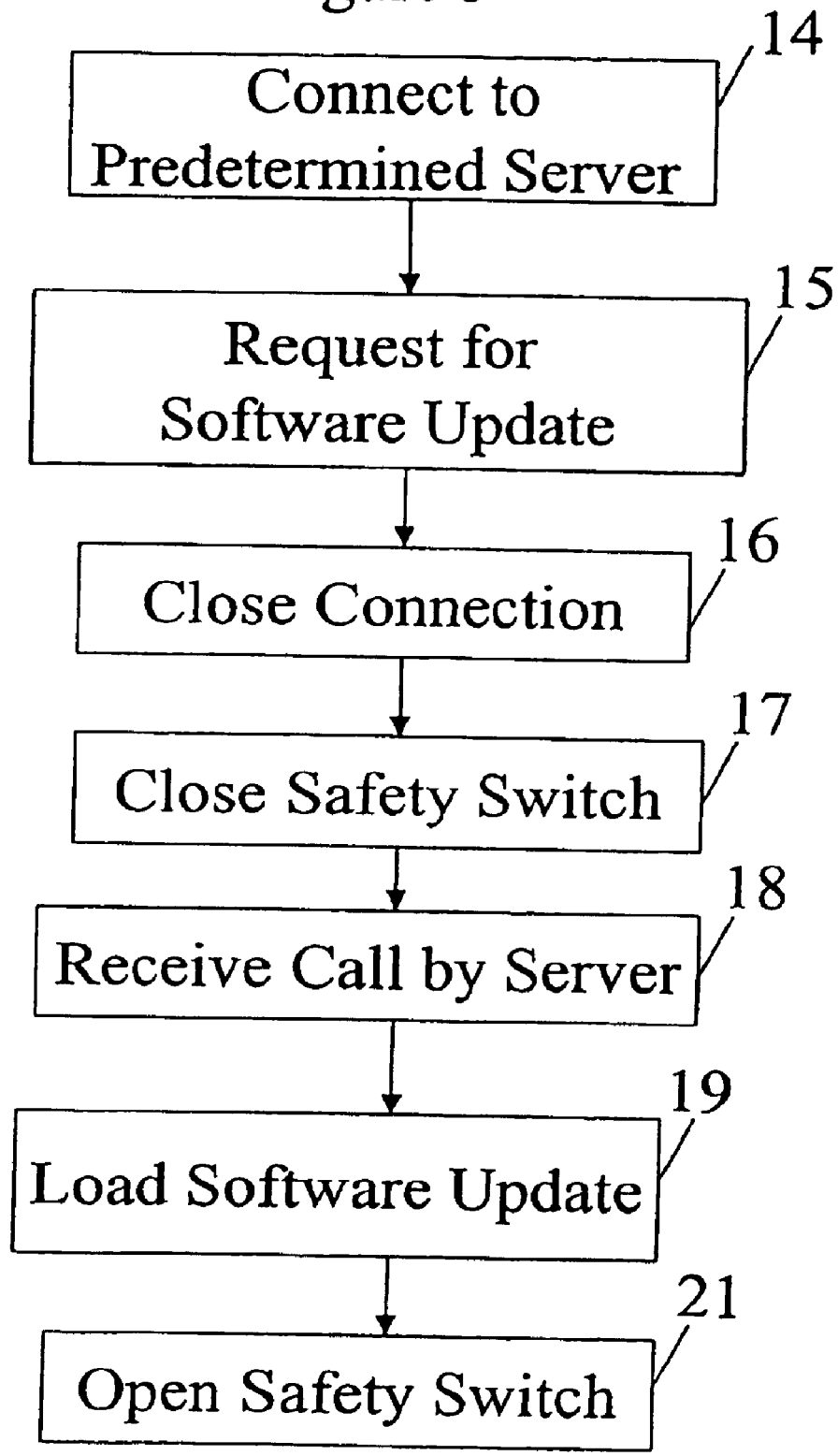
FIG. 3 shows a second flow chart according to the present invention.

FIG. 3 shows a second flow chart of a method according to the present invention. In method step 14 a user establishes a connection to a predetermined server belonging to a firm which performs teleservice, using mobile phone 5. In method step 15 the user requests a software update using mobile phone 5. Then, in method step 16, the user closes the connection via the mobile phone. In method step 17 safety switch 1 is closed, and in method step 18 the device according to the present invention receives a call from the previously called server, over mobile phone 5. The device according to the present invention is now in a position to accept this call when safety switch 1 is closed. In method step 19, the software update is then loaded by the server via mobile phone 5 and control means 4 into the appropriate component which is connected to safety network 3. In method step 21 safety switch 1 is opened again.

What is claimed is:

1. A device for connecting at least two communications networks in a motor vehicle, comprising:

a safety switch for connecting the at least two communications networks, wherein there is a permanent one-way communication between the at least two communications networks, and the safety switch is configured to close so as to extend the one-way communication to a duplex communication.

2. The device according to claim 1, wherein the at least two communications networks include a first communications network having an air interface, the air interface being activated by closing the safety switch.

3. The device according to claim 2, wherein the air interface is adapted to receive data when the safety switch is open.

4. The device according to claim 2, wherein the air interface is adapted to receive data only when the safety switch is closed.

5. The device according to claim 4, wherein the data is received from an external server via the air interface.

6. The device according to claim 2, wherein the air interface automatically contacts an opposite station when the safety switch is closed, the opposite station taking up connection with a second of the at least two communications networks in the motor vehicle.

7. The device according to claim 2, wherein the air interface establishes a connection for at least one of a remote diagnosis and a software update.

8. The device according to claim 2, wherein the air interface includes a mobile telephone.

9. The device according to claim 1, wherein the safety switch is adapted to be closed only by a user.

10. The device according to claim 1, wherein safety data from a data network is at least one of extracted and imported.

11. The device according to claim 10, wherein software is updated for components connected to the data network.

12. The device according to claim 1, wherein the at least two communications networks include a first communications network having a multimedia network.

\* \* \* \* \*